United States Patent
Matsushita et al.

(10) Patent No.: US 10,493,792 B2
(45) Date of Patent: Dec. 3, 2019

(54) PROCESSING APPARATUS AND CARTRIDGE

(71) Applicant: BROTHER KOGYO KABUSHIKI KAISHA, Nagoya, Aichi (JP)

(72) Inventors: Hironori Matsushita, Nagoya (JP); Hiroshi Yamasaki, Nagoya (JP)

(73) Assignee: BROTHER KOGYO KABUSHIKI KAISHA, Aichi-Ken (JP)

( * ) Notice: Subject to any disclaimer, the term of this patent is extended or adjusted under 35 U.S.C. 154(b) by 369 days.

(21) Appl. No.: 15/462,094

(22) Filed: Mar. 17, 2017

(65) Prior Publication Data

US 2017/0182837 A1 Jun. 29, 2017

Related U.S. Application Data

(63) Continuation of application No. PCT/JP2016/051385, filed on Jan. 19, 2016.

(30) Foreign Application Priority Data

Jan. 22, 2015 (JP) ................. 2015-010270

(51) Int. Cl.
*B44C 1/22* (2006.01)
*B23C 3/13* (2006.01)
(Continued)

(52) U.S. Cl.
CPC ............... *B44C 1/225* (2013.01); *B23C 3/13* (2013.01); *B26D 7/27* (2013.01); *B26F 1/3806* (2013.01); *B44B 3/02* (2013.01); *B44B 3/063* (2013.01)

(58) Field of Classification Search
CPC .................................................. B44C 1/225
(Continued)

(56) References Cited

U.S. PATENT DOCUMENTS

| 4,426,783 A | * | 1/1984 | Gerber | G01D 15/22 |
|  |  |  |  | 33/1 M |
| 5,296,872 A | * | 3/1994 | Caamano | B26D 7/27 |
|  |  |  |  | 346/24 |

(Continued)

FOREIGN PATENT DOCUMENTS

| JP | H01-222763 A | 9/1989 |  |
| JP | 10315197 A | * 12/1998 | ........... B26D 7/2614 |

(Continued)

OTHER PUBLICATIONS

International Search Report issued in the corresponding international application No. PCT/JP2016/051385 dated Apr. 19, 2016.

(Continued)

*Primary Examiner* — Christopher W Fulton
(74) *Attorney, Agent, or Firm* — K&L Gates LLP

(57) ABSTRACT

A processing apparatus for performing not only cutting and drawing, but also other processing, and a cartridge used for the processing apparatus are provided. The processing apparatus includes a first cartridge including: a first processing tool to form a machining mark by grinding or cutting a surface of a sheet-like object; an actuator to operate by an external power supply and drive the first processing tool; and a first housing to accommodate the first processing tool where a tip of the first processing tool is exposed and accommodate the actuator. The processing apparatus also includes a carriage including a mounting section which the first cartridge is detachably mounted; a transfer mechanism to move the object and the carriage relatively to each other; and a control circuit to control driving of the transfer mechanism to form the machining mark on the surface of the object by the first processing tool.

10 Claims, 13 Drawing Sheets

(51) Int. Cl.
*B44B 3/02* (2006.01)
*B26D 7/27* (2006.01)
*B26F 1/38* (2006.01)
*B44B 3/06* (2006.01)

(58) Field of Classification Search
USPC .......................................................... 33/18.1
See application file for complete search history.

(56) References Cited

U.S. PATENT DOCUMENTS

| | | | | |
|---|---|---|---|---|
| 8,348,414 | B2* | 1/2013 | Doo | B41J 11/002 |
| | | | | 101/116 |
| 9,283,687 | B2* | 3/2016 | Yamanashi | G05B 19/409 |
| 9,340,044 | B2* | 5/2016 | Matsushita | B41J 11/663 |
| 9,891,611 | B2* | 2/2018 | Okuyama | G05B 19/182 |
| 9,927,802 | B2* | 3/2018 | Nagai | G05B 19/4097 |
| 2007/0012152 | A1* | 1/2007 | Workman | B26D 7/2628 |
| | | | | 83/614 |
| 2011/0280999 | A1* | 11/2011 | Crystal | A21C 15/002 |
| | | | | 426/231 |
| 2012/0026232 | A1* | 2/2012 | Otoshi | B41J 2/17546 |
| | | | | 347/16 |
| 2012/0160067 | A1* | 6/2012 | Johnson | B41J 11/46 |
| | | | | 83/13 |
| 2014/0150618 | A1* | 6/2014 | Fujihara | B26D 7/26 |
| | | | | 83/401 |
| 2014/0182463 | A1 | 7/2014 | Muto | |
| 2016/0026168 | A1* | 1/2016 | Crystal | B26D 5/005 |
| | | | | 700/114 |

FOREIGN PATENT DOCUMENTS

| | | |
|---|---|---|
| JP | 2006-026799 A | 2/2006 |
| JP | 2008-036680 A | 2/2008 |
| JP | 2014-124748 A | 7/2014 |

OTHER PUBLICATIONS

Written Opinion of the International Search Authority issued in the corresponding international application No. PCT/JP2016/051385 dated Apr. 19, 2016.

Notification of Reasons for Rejection issued in connection with Japanese Patent Application No. 2015-010270, dated May 29, 2018. (10 pages).

* cited by examiner

PROCESSING APPARATUS AND CARTRIDGE

CROSS-REFERENCE TO RELATED APPLICATIONS

This application is a continuation application of International Application No. PCT/JP2016/051385, filed on Jan. 19, 2016, which claims priority from Japanese Patent Application No. 2015-010270, filed on Jan. 22, 2015. The disclosure of the foregoing application is hereby incorporated by reference in its entirety.

FIELD

The present disclosure relates to a processing apparatus that performs processing on a surface of an object using a cartridge including a processing tool, and a cartridge used for the processing apparatus.

BACKGROUND

Heretofore, a cutting apparatus that cuts a sheet-like object, such as paper, into a desired shape has been publicly known. The cutting apparatus includes not only a cutter cartridge for cutting an object, but also a pen cartridge incorporating a pen and a carriage on which these cartridges are selectively mountable. Thus, in the cutting apparatus, when the pen cartridge is mounted on the carriage, a desired pattern or design can be drawn on the surface of the object.

However, there is a demand for the cutting apparatus to perform not only cutting and drawing, but also other processing on an object. Examples of other processing include processing of forming a machining mark by grinding or cutting the surface of the object.

SUMMARY

An object of the present disclosure is to provide a processing apparatus capable of performing processing for forming a machining mark by grinding or cutting a surface of an object, and a cartridge used for the processing apparatus.

In order to attain the above-mentioned object, a processing apparatus according to a first aspect of the present disclosure includes: a first cartridge including: a first processing tool configured to form a machining mark by grinding or cutting a surface of a sheet-like object; an actuator configured to operate by an external or internal power supply and drive the first processing tool; and a first housing configured to accommodate the first processing tool in a state where a tip of the first processing tool is exposed and also accommodate the actuator; a carriage including a mounting section configured to detachably mount the first cartridge; a transfer mechanism configured to move the object and the carriage relatively to each other; and a control section configured to control driving of the transfer mechanism in such a way that the machining mark is formed on the surface of the object by the first processing tool.

A cartridge according to a second aspect of the present disclosure includes: a first processing tool configured to form a machining mark by grinding or cutting a surface of a sheet-like object; an actuator configured to operate by an external or internal power supply and drive the first processing tool; and a housing configured to accommodate the first processing tool in a state where a tip of the first processing tool is exposed and also accommodate the actuator. In the cartridge, the machining mark is formed on the surface of the object by the first processing tool in such a way that the object and the cartridge are moved relatively to each other in a state where the cartridge is detachably mounted on a mounting section of a carriage included in a processing apparatus and the actuator is operated.

This summary is not intended to identify critical or essential features of the disclosure, but instead merely summarizes certain features and variations thereof. Other details and features will be described in the sections that follow.

BRIEF DESCRIPTION OF THE DRAWINGS

Aspects of the disclosure are illustrated by way of example, and not by limitation, in the accompanying figures in which like reference characters may indicate similar elements.

DETAILED DESCRIPTION

For a more complete understanding of the present disclosure, needs satisfied thereby, and the objects, features, and advantages thereof, reference now is made to the following descriptions taken in connection with the accompanying drawings. Hereinafter, illustrative embodiments will be described with reference to the accompanying drawings.

A processing apparatus and a cartridge according to a plurality of embodiments of the present disclosure will be described with reference to the drawings.

First Embodiment

First, a first embodiment will be described with reference to FIGS. 1 to 9.

Figure 1:
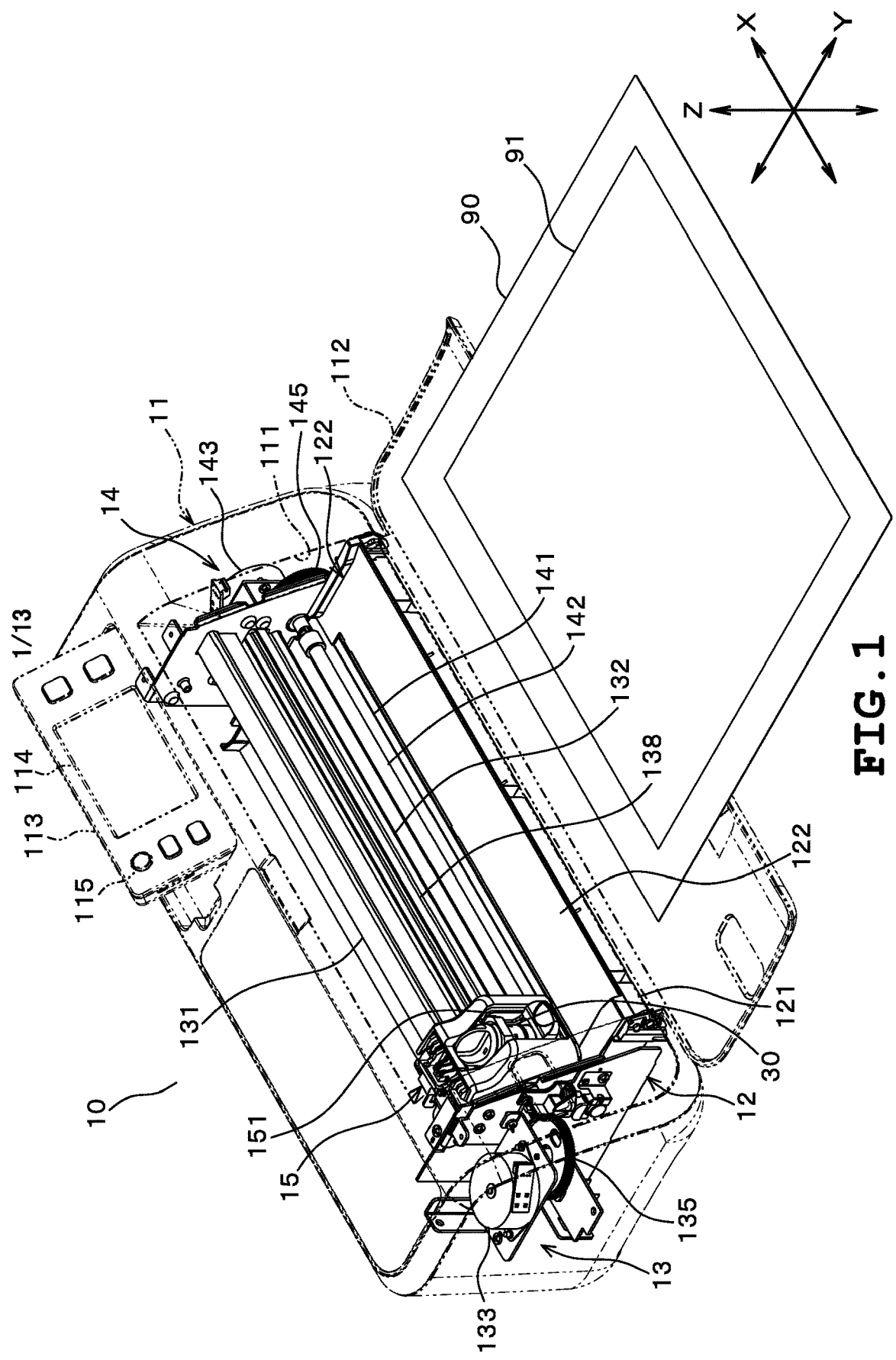
FIG. 1 is a perspective view illustrating an example of a processing apparatus according to a first embodiment.
Figure 2:
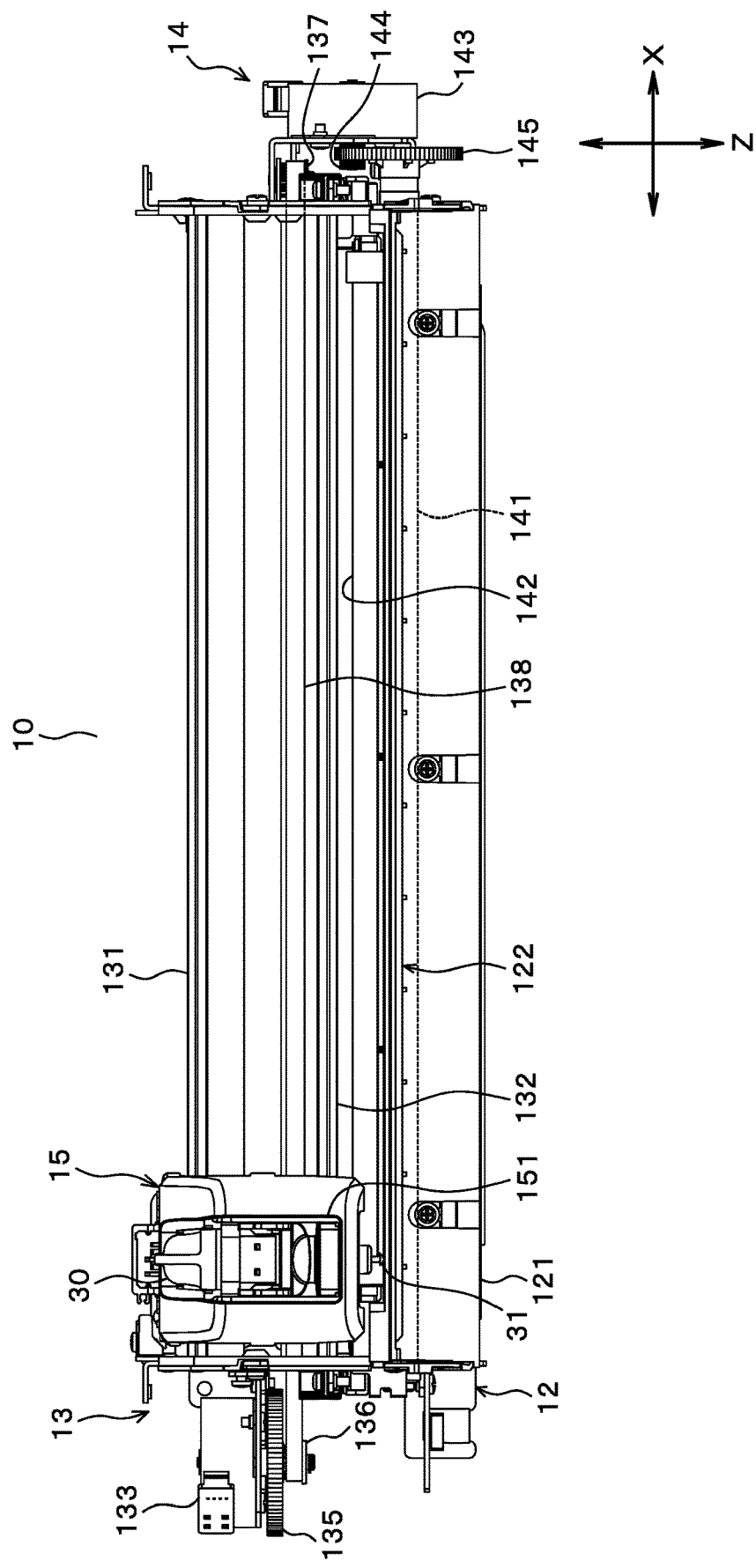
FIG. 2 is a front view illustrating the processing apparatus in a state where a main body cover is dismounted.

FIGS. 1 and 2 illustrate a processing apparatus 10 of the present disclosure. The processing apparatus 10 performs processing on a sheet-like object 91 that is held on a holding member 90 illustrated in FIG. 1. Specifically, the processing apparatus 10 forms a machining mark by grinding or cutting a surface of the object 91. As a result, a desired pattern or design that is formed of the machining mark is formed on the surface of the object 91.

The holding member 90 is a flat plate which is made of resin and includes an adhesive layer (not illustrated) formed on a surface thereof. The holding member 90 holds the sheet-like object 91, such as paper or resin, in such a manner that the object 91 is bonded to the adhesive layer. As illustrated in FIGS. 1 and 2, the processing apparatus 10 includes a main body cover 11, an apparatus main body 12, an X-axis transfer mechanism 13, a Y-axis transfer mechanism 14, a Z-axis transfer mechanism, which is not illustrated, and a carriage 15. As illustrated in FIG. 2, the processing apparatus 10 includes a first cartridge 30. As described in detail later, the first cartridge 30 includes a first processing tool 31 and is detachably mounted on the carriage 15. The first cartridge 30 is configured to form a machining mark on the surface of the object 91 by grinding or cutting.

The main body cover 11 is formed in a rectangular box shape as a whole and covers the outside of each of the apparatus main body 12, the X-axis transfer mechanism 13, the Y-axis transfer mechanism 14, the carriage 15, and the first cartridge 30. In the following description, the longitudinal direction of the main body cover 11 corresponds to the right-left direction of the processing apparatus 10 and the side of the main body cover 11 in which an opening 111, which is described later, is formed corresponds to the front side of the processing apparatus 10. The right-left direction of the processing apparatus 10 is defined as an X-axis direction; the front-back direction of the processing apparatus 10 is defined as a Y-axis direction, and the vertical direction of the processing apparatus 10 is defined as a Z-axis direction.

The opening 111 is formed in the front surface of the main body cover 11. An opening (not illustrated) through which the holding member 90 can pass is formed in the back surface of the main body cover 11 that faces the opening 111. A front cover 112 is pivotally provided on the main body cover 11. The front cover 112 pivots between a position where the opening 111 is opened and a position where the opening 111 is closed. A control panel 113 is provided on the main body cover 11. The control panel 113 includes an input display section 114 and a plurality of buttons 115. The input display section 114 is composed of a liquid crystal display and a transparent touch panel. A user operates the control panel 113, thereby enabling various settings and checking of an operation status.

The apparatus main body 12 includes a base 121 and a receiving mechanism 122. The base 121 is formed in a rectangular frame shape and is provided at the bottom of the main body cover 11. The receiving mechanism 122 is formed in a flat plate shape that is substantially horizontal. The holding member 90 that holds the object 91 is placed on the receiving mechanism 122. When processing is performed on the object 91, the receiving mechanism 122 receives a pressing force that is applied from a lower end (a processing section 312 described later) of the first cartridge 30 to the object 91 and the holding member 90.

The X-axis transfer mechanism 13 moves the carriage 15 in the right-left direction, i.e., the X-axis direction. The X-axis transfer mechanism 13 includes a pair of upper and lower X-axis guide rails 131 and 132, an X-axis motor 133, an X-axis drive gear (not illustrated), an X-axis driven gear 135, a pair of pulleys 136 and 137, and a timing belt 138.

The pair of upper and lower X-axis guide rails 131 and 132 are provided side by side in the vertical direction. The X-axis motor 133 is, for example, a stepping motor. The X-axis drive gear is fixed to the rotating shaft (not illustrated) of the X-axis motor 133. The X-axis drive gear engages with the X-axis driven gear 135.

Out of the pair of right and left pulleys 136 and 137, the left pulley 136 is provided on a lower surface of the X-axis driven gear 135. The left pulley 136 is rotated integrally with the X-axis driven gear 135. The timing belt 138 is hung between the left pulley 136 and the right pulley 137. Although not illustrated in detail, a part of the timing belt 138 is connected to the carriage 15.

In this structure, when the rotating shaft of the X-axis motor 133 is rotated, the X-axis drive gear, the X-axis driven gear 135, and the left pulley 136 are rotated along with the rotation of the rotating shaft of the X-axis motor 133. When the left pulley 136 is rotated, the timing belt 138 is moved. Accordingly, the carriage 15 is moved in the right-left direction, i.e., the X-axis direction along with the movement of the timing belt 138.

The Y-axis transfer mechanism 14 moves the object 91, which is held by the holding member 90, in the front-back direction, i.e., the Y-axis direction. The Y-axis transfer mechanism 14 includes a drive roller 141, a pinch roller 142, a Y-axis motor 143, a Y-axis drive gear 144, and a Y-axis driven gear 145. The drive roller 141 and the pinch roller 142 are provided in parallel with the X-axis guide rails 131 and 132 in such a manner that the shaft center of each roller faces in the right-left direction, i.e., the X-axis direction. The holding member 90 arranged between the drive roller 141 and the pinch roller 142 is pressed against the drive roller 141 by the pinch roller 142.

The Y-axis motor 143 is, for example, a stepping motor. The Y-axis drive gear 144 is fixed to the rotating shaft (not illustrated) of the Y-axis motor 143. The Y-axis driven gear 145 is fixed to a right end of the drive roller 141. The Y-axis drive gear 144 engages with the Y-axis driven gear 145.

In this structure, when the rotating shaft of the Y-axis motor 143 is rotated, the Y-axis drive gear 144, the Y-axis driven gear 145, and the drive roller 141 are rotated along with the rotation of the rotating shaft of the Y-axis motor 143. When the drive roller 141 is rotated, the holding member 90 sandwiched between the drive roller 141 and the pinch roller 142 is moved in the front-back direction, i.e., the Y-axis direction. Thus, the X-axis transfer mechanism 13 and the Y-axis transfer mechanism 14 move the object 91 and the carriage 15 relatively to each other.

Figure 5:
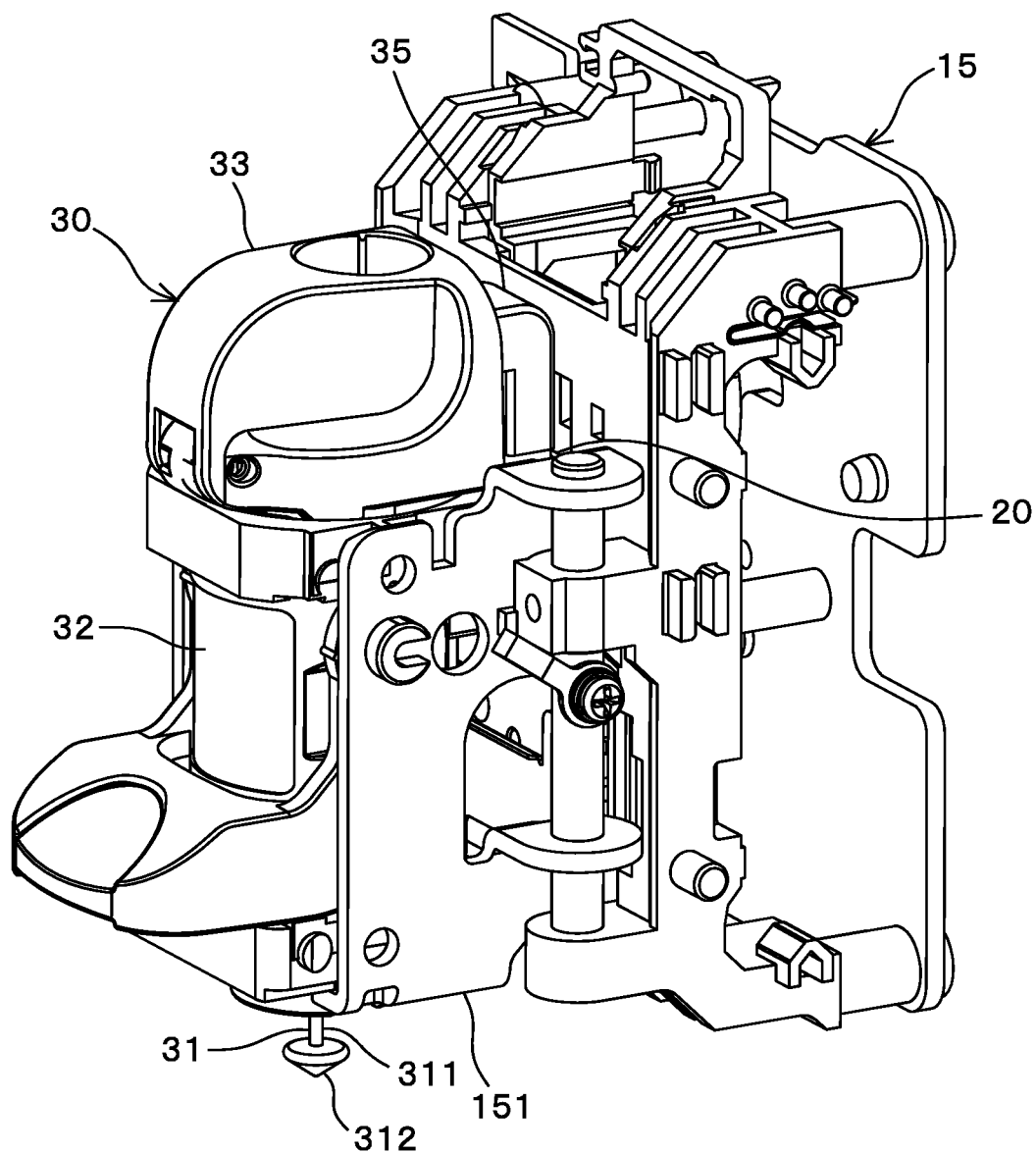
FIG. 5 is a perspective view illustrating a structure in the vicinity of the carriage in a state where the first cartridge is mounted on the mounting section.

The carriage 15 includes a mounting section 151 and a Z-axis transfer mechanism which is not illustrated. The mounting section 151 is provided at the front side of the carriage 15. The first cartridge 30 is detachably mounted on the mounting section 151 and held by the mounting section 151. As illustrated in FIGS. 2 and 5, the first cartridge 30 is mounted on the mounting section 151 in a state where the processing section 312 of the first processing tool 31 is exposed. The Z-axis transfer mechanism, which is not illustrated, is provided in the carriage 15 and moves the mounting section 151 as well as the first cartridge 30 in the vertical direction, i.e., the Z-axis direction.

In this structure, when the mounting section 151 is moved downward by the Z-axis transfer mechanism, the processing section 312 of the first processing tool 31 that is attached to the first cartridge 30 contacts the surface of the object 91 that is held by the sheet-like holding member 90. At this time, specifically, the processing section 312 presses the surface of the object 91 with a prescribed pressing force. In the processing apparatus 10, the carriage 15 is moved in the X-axis direction by the X-axis transfer mechanism 13 and the object 91 is moved in the Y-axis direction by the Y-axis transfer mechanism 14 in a state where the processing section 312 of the first processing tool 31 is brought into contact with the object 91. Thus, the processing apparatus 10 forms a machining mark by grinding or cutting the surface of the object 91. In other words, a desired pattern or design that is formed of the machining mark is formed on the surface of the object 91.

In this case, the depth of the machining mark formed on the surface of the object 91 is, for example, about 0.01 mm to 0.03 mm. However, the depth of the machining mark is not limited to this value. The depth of the machining mark varies depending on the type of the object 91 and the pressing force of the processing section 312 that presses the surface of the object 91. Accordingly, the pressing force is preferably changed as appropriate depending on the type of the object 91.

Figure 3:
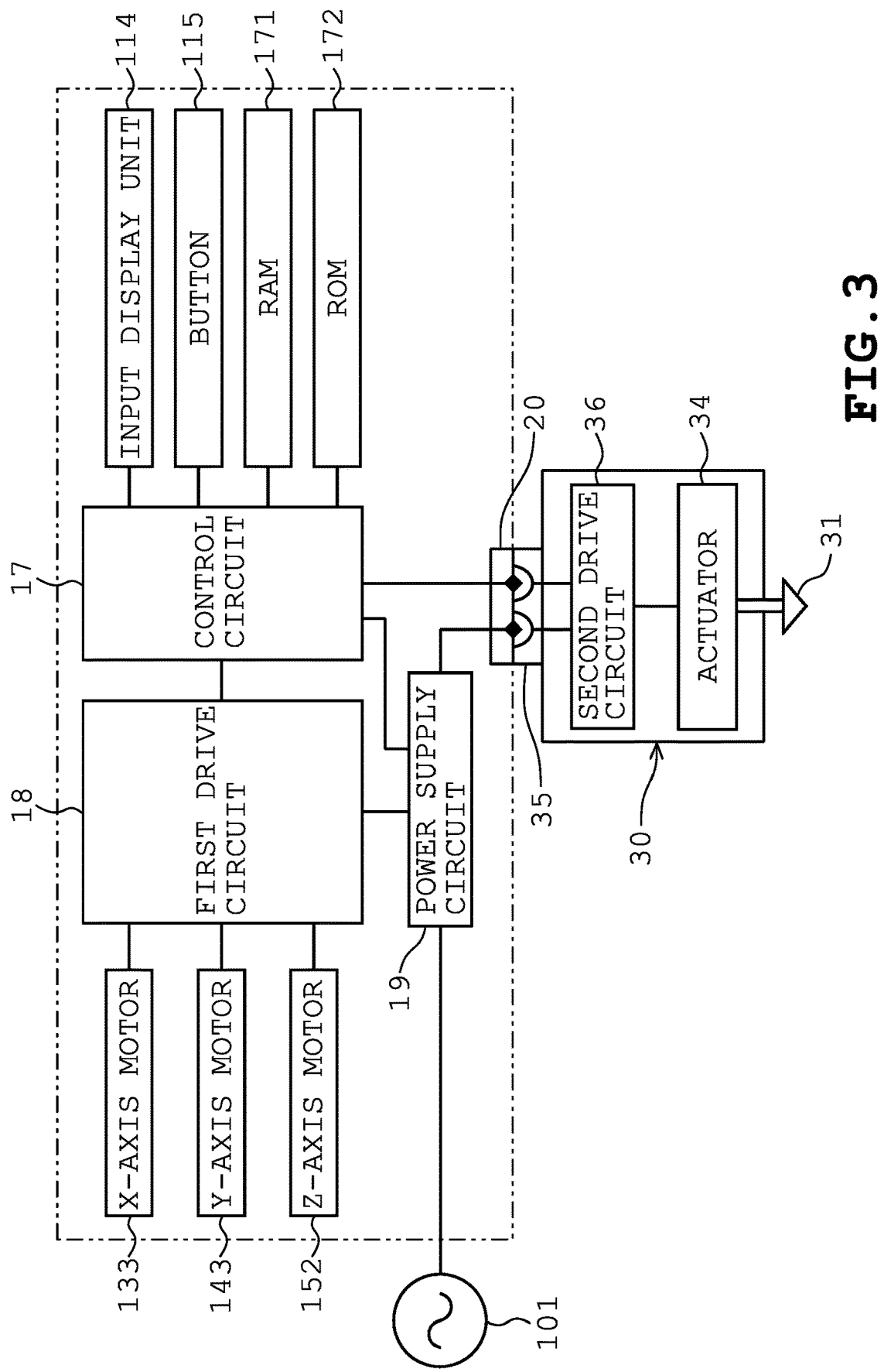
FIG. 3 is a block diagram illustrating an electrical configuration of the processing apparatus.

Next, the electrical configuration of the processing apparatus 10 will be described. As illustrated in FIG. 3, the processing apparatus 10 includes a control circuit 17, a drive circuit 18 for transfer mechanisms (hereinafter referred to as the first drive circuit 18), a power supply circuit 19, and a connected section 20. The control circuit 17 includes a central processing unit (CPU) and controls the entire processing apparatus 10. In this case, the control circuit 17 functions as a control section that controls driving of the X-axis transfer mechanism 13, the Y-axis transfer mechanism 14, and the Z-axis transfer mechanism. The control circuit 17 is connected to each of the input display section 114 and the buttons 115 of the control panel 113, a RAM 171, a ROM 172, the first drive circuit 18, and the power supply circuit 19.

The RAM 171 stores processed data for driving the motors 133, 143, and 152 to perform processing on the object 91. The ROM 172 stores a drive control program and the like for controlling driving of the motors 133, 143 and 152 on the basis of the processed data stored in the RAM 171. The first drive circuit 18 drives each of the X-axis motor 133, the Y-axis motor 143, and the Z-axis motor 152 on the basis of an instruction from the control circuit 17. The power supply circuit 19 is connected to an external power supply 101 such as a commercial power supply (AC power supply). The power supply circuit 19 is connected to the control circuit 17, the first drive circuit 18, and a second drive circuit 36 which is described later. The power supply circuit 19 supplies the electric power supplied from the external power supply 101 to each of the control circuit 17, the first drive circuit 18, and the second drive circuit 36. The power supply circuit 19 is controlled by the control circuit 17.

Figure 4:
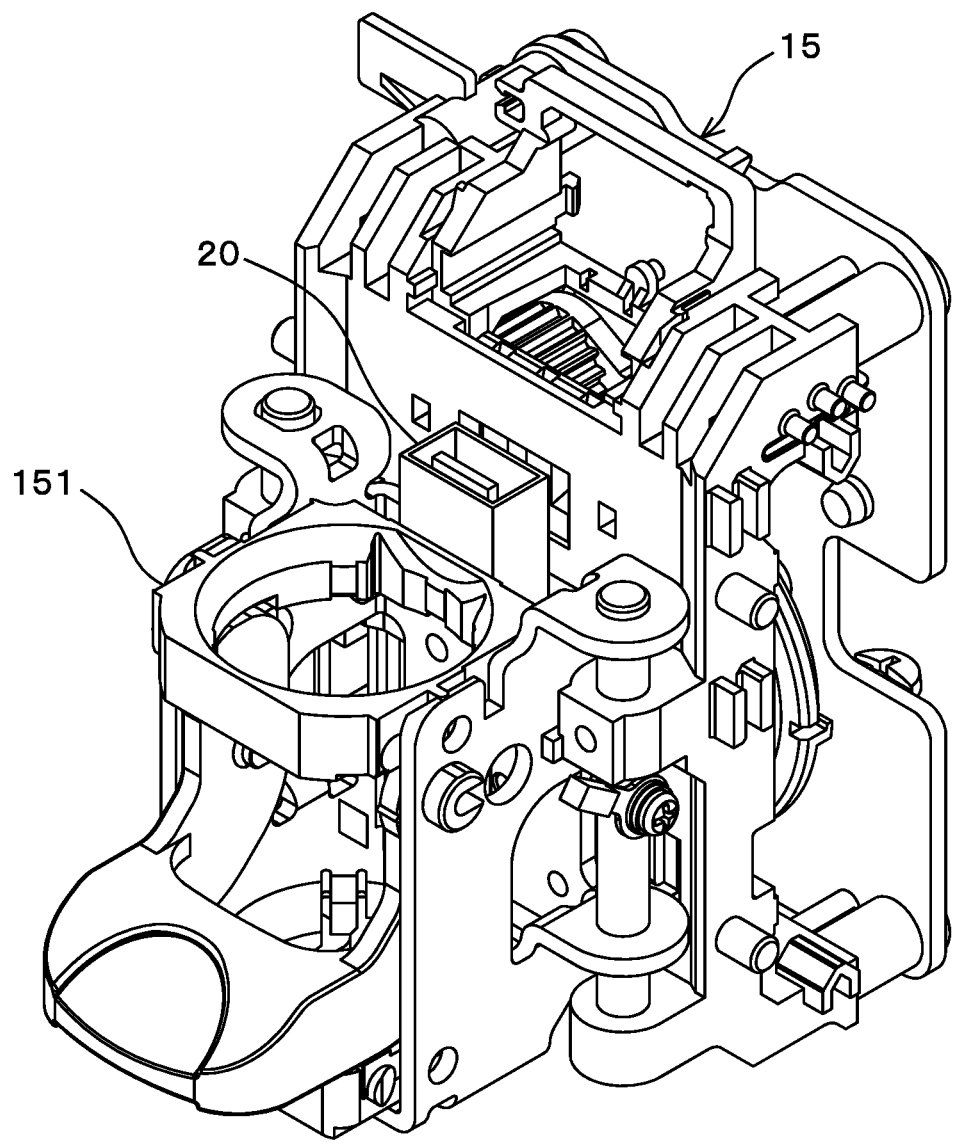
FIG. 4 is a perspective view illustrating a structure in the vicinity of a carriage in a state where a first cartridge is dismounted from a mounting section.
Figure 6:
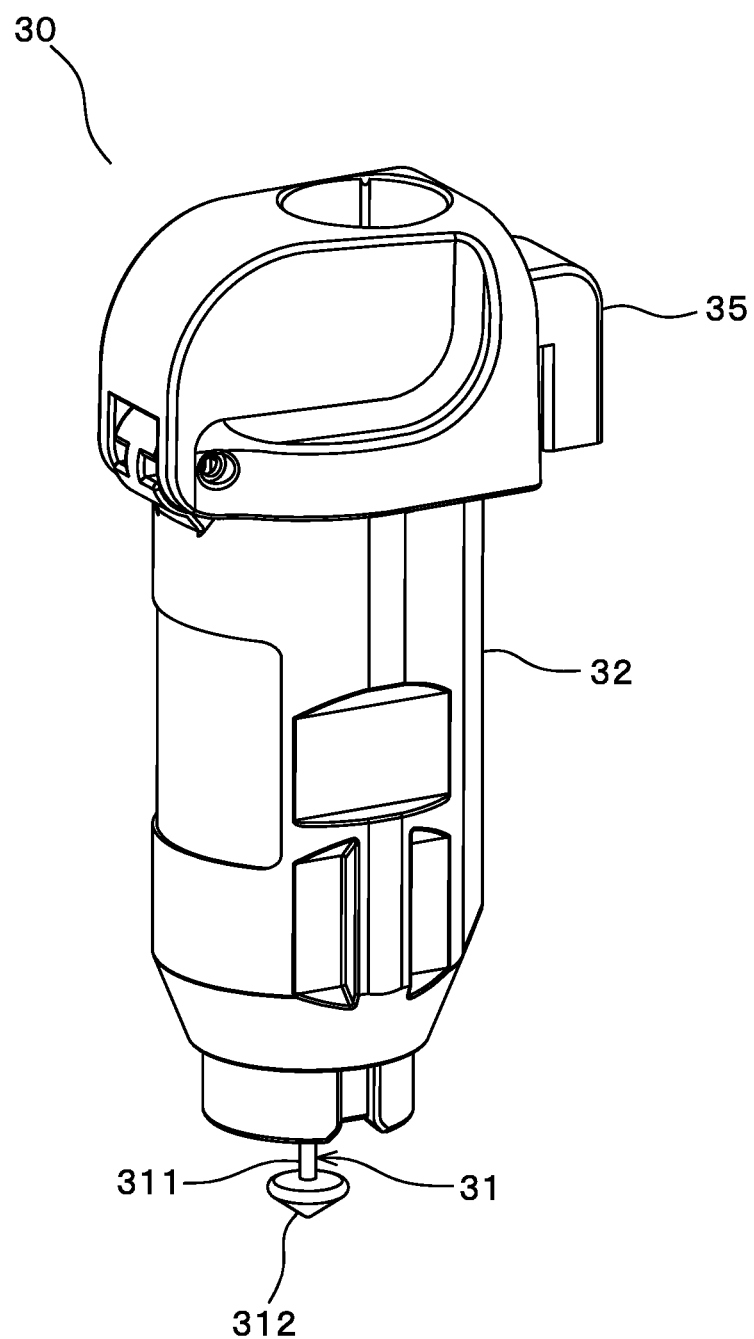
FIG. 6 is a perspective view illustrating the first cartridge.

As illustrated in FIG. 4, the connected section 20 is, for example, a female connector, and is formed upward at the front side of the carriage 15. The connected section 20 is electrically connected to each of the control circuit 17 and the power supply circuit 19. As illustrated in FIGS. 4 to 6, the connected section 20 is provided at a location connected to a connecting section 35 of the first cartridge 30 when the first cartridge 30 is mounted on the mounting section 151.

Figure 7:
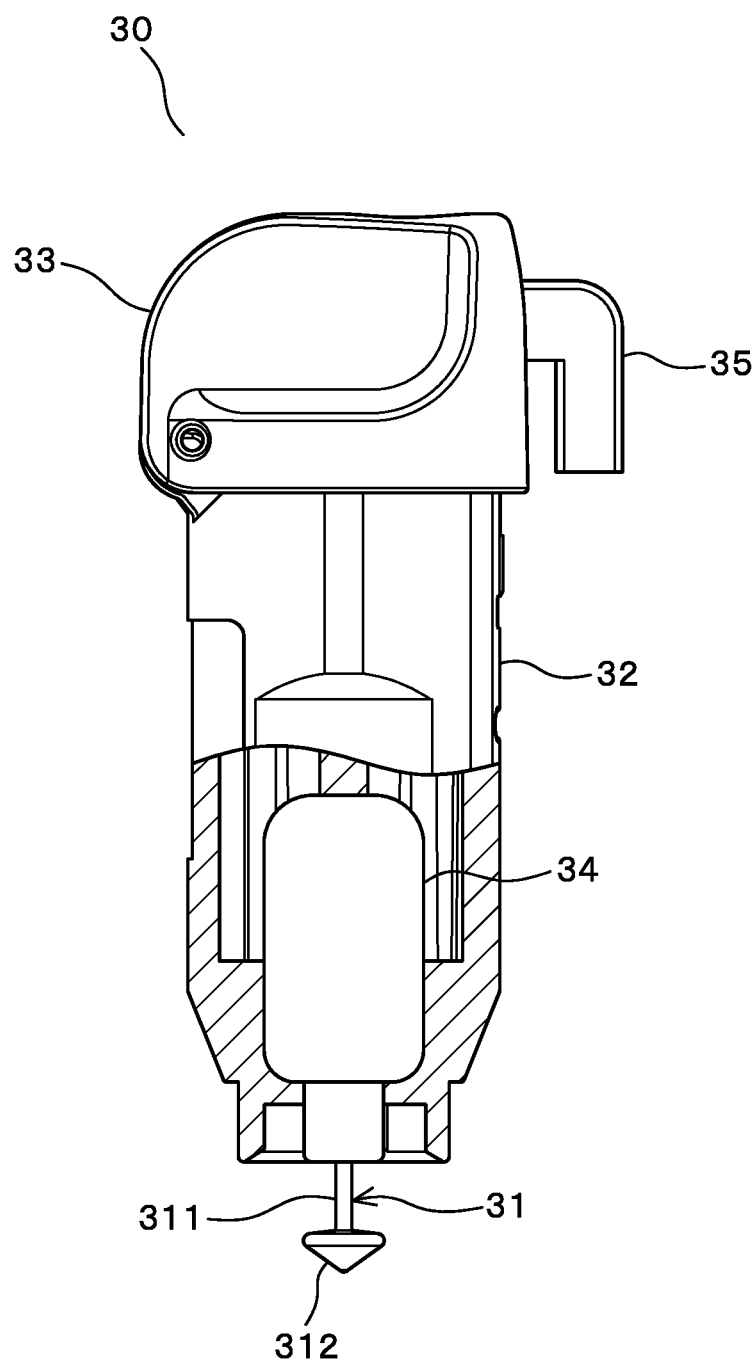
FIG. 7 is a side view illustrating a cross-section of a part of the first cartridge.

Next, the structure of the first cartridge 30 will be described. As illustrated in FIGS. 6 and 7, the first cartridge 30 includes the first processing tool 31, an actuator 34, a first housing 32, a pinch section 33, the connecting section 35, and the drive circuit 36 for the actuator illustrated in FIG. 3 (hereinafter referred to as the second drive circuit 36). The first processing tool 31 includes a columnar shaft section 311 extending in the vertical direction, and the processing section 312 provided at a tip, i.e., a lower end, of the shaft section 311. The processing section 312 is a conical grinding stone that is tapered downward. In this case, the first processing tool 31 grinds the surface of the object 91, thereby making it possible to form a machining mark. The processing section 312 may be a so-called end mill having a blade formed at a tip of a columnar shaft section, although it is not illustrated. In this case, the first processing tool 31 can form a machining mark by cutting the surface of the object 91.

The shaft section 311 of the first processing tool 31 is attached to the actuator 34. The actuator 34 is configured to operate by an external power supply or an internal power supply of the first cartridge 30 and drive the first processing tool 31. The internal power supply will be described later. In this embodiment, the actuator 34 is a motor that operates with electric power supplied from the external power supply 101 through the power supply circuit 19 and the second drive circuit 36 and rotates the first processing tool 31. The processing section 312 may be formed integrally with a tip of the rotating shaft of the actuator 34. The actuator 34 is not limited to the motor, but instead may be, for example, an ultrasonic vibrator. In this case, the actuator 34 can drive the first processing tool 31 by vibration.

The first housing 32 constitutes the main body of the first cartridge 30. The first housing 32 is made of, for example, resin, is formed in a cylindrical shape as a whole and elongated in the vertical direction, and has a space formed therein. The actuator 34 and a part of a proximal end, i.e., the shaft section 311, of the first processing tool 31 are accommodated in the first housing 32. Specifically, the first housing 32 accommodates the first processing tool 31 in a state where the processing section 312, which is a tip of the first processing tool 31, is exposed, and also accommodates the actuator 34. The pinch section 33 is made of, for example, resin, and is provided at an upper end of the first housing 32. The user can handle the first cartridge 30 by pinching the pinch section 33.

The connecting section 35 electrically connects the control circuit 17 and the power supply circuit 19 to the second drive circuit 36. The connecting section 35 is a male connector corresponding to the female connector, which is the connected section 20, and is formed downward at an upper part of the back side of the first housing 32. In this case, the connecting section 35 is formed downward at the back side of the pinch section 33. The connecting section 35 is formed so as to be able to engage with the connected section 20. As illustrated in FIG. 3, the connecting section 35 is electrically connected to the actuator 34 through the second drive circuit 36. Specifically, the connecting section 35 and the second drive circuit 36 are connected with a lead wire, and the second drive circuit 36 and the actuator 34 are connected with a lead wire. However, in FIG. 7, the illustration of the second drive circuit 36 and lead wires is omitted. The connected section 20 and the connecting section 35 are not limited to the connectors having shapes as illustrated in the drawings. Any connectors may be used as the connected section 20 and the connecting section 35, as long as the connectors can electrically connect the control circuit 17 and the power supply circuit 19 which are provided in the apparatus main body 12 to the second drive circuit 36 provided in the first cartridge 30.

When the connecting section 35 and the connected section 20 are connected, electric power from the external power supply 101 is supplied to the actuator 34 through the power supply circuit 19 provided in the apparatus main body 12 and the second drive circuit 36 provided in the first cartridge 30. Further, when the connecting section 35 and the connected section 20 are connected, the control circuit 17 outputs an operation command for the actuator 34 to the second drive circuit 36. Thus, the second drive circuit 36 receives the operation command from the control circuit 17 provided in the apparatus main body 12, and operates the actuator 34.

In this case, the control circuit 17 controls the power supply circuit 19. Specifically, the control circuit 17 controls the electric power supplied to the actuator 34 from the external power supply 101. Thus, the number of rotations (rotational speed) of the actuator 34 (in this case, a motor) is controlled. The second drive circuit 36 may control the number of rotations (rotational speed) of the actuator 34 (in this case, a motor) on the basis of the operation command from the control circuit 17. Thus, the control circuit 17 can control the start and suspension of the operation of the actuator 34 and the number of rotations (rotational speed) of the actuator 34. The second drive circuit 36 is, for example, a switching relay, and may switch the conduction and non-conduction of electric power supplied to the actuator 34 from the external power supply 101 on the basis of the operation command from the control circuit 17.

In the case of forming a machining mark on the surface of the object 91 by grinding, the user mounts the first cartridge 30 on the mounting section 151 of the carriage 15. Then, when the first cartridge 30 is mounted, the connecting section 35 provided in the first cartridge 30 is connected to the connected section 20 provided in the apparatus main body 12. Accordingly, the first cartridge 30 and the apparatus main body 12 are electrically connected, which allows the actuator 34 of the first cartridge 30 to operate.

The control circuit 17 can detect that the connecting section 35 of the first cartridge 30 is connected to the connected section 20. For example, the control circuit 17 measures a potential between the power supply circuit 19 and the connected section 20. When the potential is changed, the control circuit 17 detects that the connecting section 35 is connected to the connected section 20. Unlike the structure described above, the apparatus main body 12 may have a structure including a sensor which detects that the connected section 20 and the connecting section 35 are connected to each other.

The control circuit 17 executes a program for processing, thereby operating the actuator 34 and rotating the first processing tool 31. The control circuit 17 drives the X-axis transfer mechanism 13, the Y-axis transfer mechanism 14, and the Z-axis transfer mechanism on the basis of processed data in a state where the first processing tool 31 is rotated, and moves the carriage 15 and the object 91 relatively to each other, while bringing the processing section 312 of the first processing tool 31 into contact with the surface of the object 91. Thus, a machining mark is formed on the surface of the object 91 by grinding, and the machining mark forms a desired pattern or design on the surface of the object 91.

Figure 8:
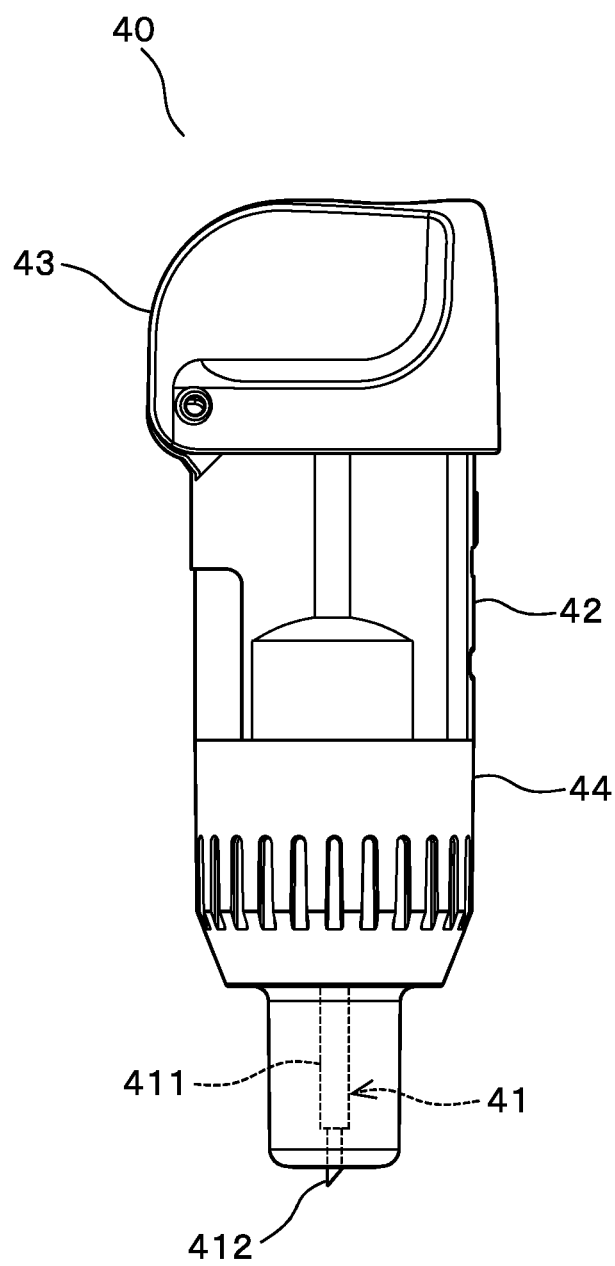
FIG. 8 is a side view illustrating a second cartridge.
Figure 9:
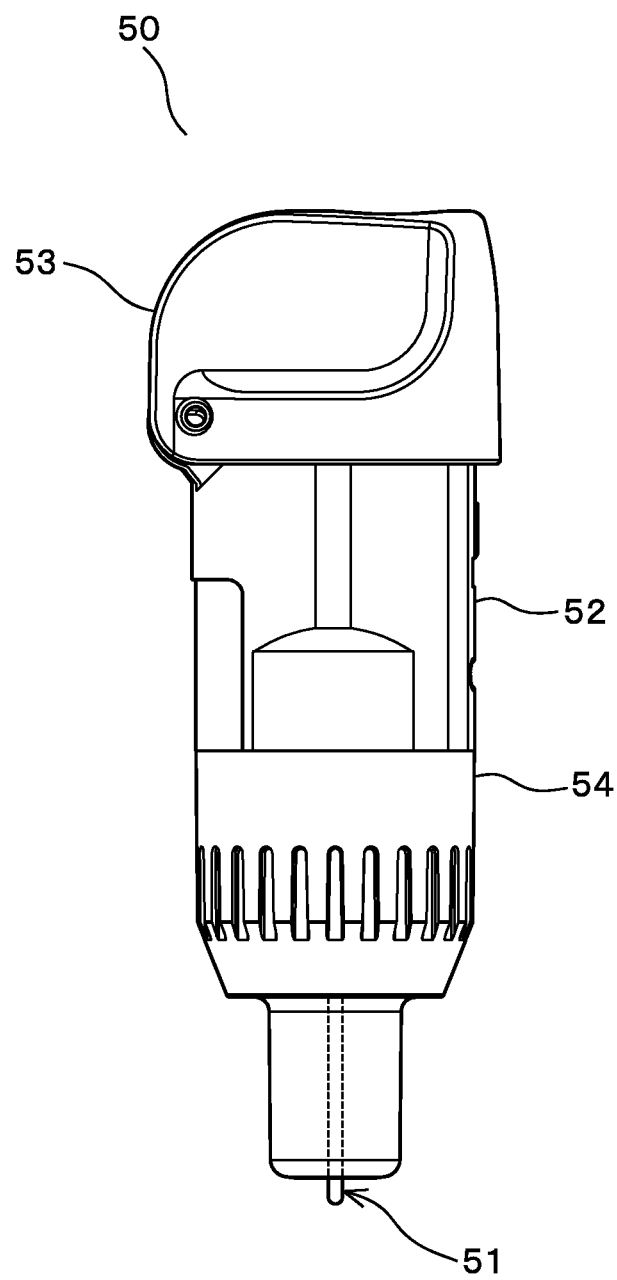
FIG. 9 is a side view illustrating a third cartridge.

The processing apparatus 10 further includes a second cartridge 40 illustrated in FIG. 8 and a third cartridge 50 illustrated in FIG. 9. The second cartridge 40 is used for cutting the object 91 into a desired shape. The third cartridge 50 is used for drawing a desired pattern or design on the surface of the object 91.

As illustrated in FIG. 8, the second cartridge 40 includes a second processing tool 41, a second housing 42, a pinch section 43, and a cap 44. The second processing tool 41 is, for example, a cutter, and includes a shaft section 411 extending in the vertical direction and a blade section 412 formed at a tip (lower end) of the shaft section 411. The shaft section 411 and the blade section 412 are integrally formed.

The second processing tool 41 is not limited to this structure. For example, the second processing tool 41 may have a structure in which a flat-plate-shaped blade section is fixed to a tip of the shaft section.

The second housing 42 constitutes the main body of the second cartridge 40. Like the first housing 32, the second housing 42 is made of, for example, resin, and formed in a cylindrical shape as a whole elongated in the vertical direction, and has a space in which the shaft section 411 of the second processing tool 41 is accommodated. A proximal end, i.e., the shaft section 411, of the second processing tool 41 is accommodated in the second housing 42. Specifically, the second housing 42 accommodates the second processing tool 41 in a state where the blade section 412, which is a tip of the second processing tool 41, is exposed. The pinch section 43 has a structure similar to that of the pinch section 33 of the first cartridge 30. The cap 44 is provided in such a manner that the cap 44 is rotatably screwed into a lower part of the second housing 42. Although the detailed illustration is omitted, the cap 44 is rotated, thereby making it possible to change the amount of projection of the blade section 412.

The third cartridge 50 includes a pen 51, a third housing 52, a pinch section 53, and a cap 54. The pen 51 is formed in, for example, a rod shape elongated in the vertical direction. The third housing 52, the pinch section 53, and the cap 54 of the third cartridge 50 have structures respectively similar to those of the second housing 42, the pinch section 43, and the cap 44 of the second cartridge 40, respectively. Specifically, the third housing 52 accommodates the pen 51 in a state where a tip of the pen 51 is exposed. The second cartridge 40 and the third cartridge 50 are mountable on the mounting section 151 of the carriage 15. In other words, the first cartridge 30, the second cartridge 40, and the third cartridge 50 can be selectively mounted on the mounting section 151.

In this embodiment, the second cartridge 40 and the third cartridge 50 do not have any structure corresponding to the connecting section 35 of the first cartridge 30. However, the second cartridge 40 and the third cartridge 50 may have a dummy connecting section, i.e., a structure similar to the connecting section 35. In this case, for example, a potential difference generated on the output side of the power supply circuit 19 when the dummy connecting section is connected to the connected section 20 is set to be different from a potential difference generated on the output side of the power supply circuit 19 when the connecting section 35 of the first cartridge 30 is connected to the connected section 20. Thus, the control circuit 17 detects that any one of the first cartridge 30, the second cartridge 40, and the third cartridge 50 is mounted on the mounting section 151.

When it is detected that the first cartridge 30 is mounted on the mounting section 151, the control circuit 17 controls driving of each of the transfer mechanisms described above in such a way that a machining mark is formed by grinding the surface of the object 91 by the first processing tool 31. Further, when the control circuit 17 detects that the second cartridge 40 is mounted on the mounting section 151, the control circuit 17 controls driving of each of the transfer mechanisms so that the object 91 is cut by the second processing tool 41. When the control circuit 17 detects that the third cartridge 50 is mounted on the mounting section 151, the control circuit 17 controls driving of each of the transfer mechanisms so that a pattern or the like is drawn on the surface of the object 91 by the pen 51.

With this structure, the processing apparatus 10 is capable of performing not only cutting and drawing, but also other processing on the object 91, such as processing for forming a pattern or design by forming a machining mark by grinding. In other words, according to the processing apparatus 10 and the first cartridge 30 of this embodiment, not only cutting and drawing, but also other processing can be performed on the object 91. This results in expanding the user's choice to perform processing and enhancing the user's convenience. When an end mill is used as the processing section 312 of the first processing tool 31 of the first cartridge 30, instead of using a grinding stone, the processing apparatus 10 can perform processing for forming a pattern or design on the object 91 by forming a machining mark by cutting the object 91.

When the connecting section 35 provided in the first cartridge 30 is connected to the connected section 20 provided in the apparatus main body 12, electric power from the external power supply 101 is supplied to the actuator 34 through the power supply circuit 19 provided in the apparatus main body 12 and the second drive circuit 36 provided in the first cartridge 30. This eliminates the need for providing the first cartridge 30 with a power supply for operating the actuator 34. Accordingly, the number of components constituting the first cartridge 30 can be reduced, which leads to a reduction in the weight and size of the first cartridge 30 and a reduction in the cost of components.

The control circuit 17 controls the power supply circuit 19, thereby making it possible to control the electric power supplied to the actuator 34 from the external power supply 101. Specifically, the control circuit 17 controls the movement of each transfer mechanism and the operation and the number of rotations (rotational speed) of the actuator 34. Accordingly, the control circuit 17 can perform processing control suitable for the type of the object 91 on the basis of processed data.

The connected section 20 provided in the drive main body 12 is provided at a location connected to the connecting section 35 when the first cartridge 30 is mounted on the mounting section 151. Accordingly, when the first cartridge 30 is mounted on the mounting section 151, the connecting section 35 provided in the first cartridge 30 is inevitably connected to the connected section 20 provided in the apparatus main body 12. Then, the control circuit 17 and the power supply circuit 19 which are provided in the apparatus main body 12 are electrically connected to the second drive circuit 36 provided in the first cartridge 30. In this case, there is no need for the user to conduct work other than work for mounting the first cartridge 30 on the mounting section 151 so as to connect the control circuit 17 and the power supply circuit 19 which are provided in the apparatus main body 12 to the second drive circuit 36 provided in the first cartridge 30. Accordingly, it is possible to save the user time and labor and prevent the user from forgetting to connect the control circuit 17 and the power supply circuit 19 which are provided in the apparatus main body 12 to the second drive circuit 36 provided in the first cartridge 30, or prevent a connection failure.

The processing apparatus 10 includes not only the first cartridge 30 including the first processing tool 31, but also the second cartridge 40 including the second processing tool 41 and the third cartridge 50 including the pen 51. The first cartridge 30, the second cartridge 40, and the third cartridge 50 can be selectively mounted on the mounting section 151. Accordingly, the processing apparatus 10 is capable of performing not only formation of a machining mark by the first processing tool 31, but also cutting by the second processing tool 41 and drawing by the pen 51. This results in expanding the user's choice to perform processing and further enhancing the user's convenience.

Second Embodiment

Next, a second embodiment will be described with reference to FIGS. 10 and 11. Components of the second embodiment that are different from those of the first embodiment will be mainly described.

In the second embodiment, the processing apparatus 10 includes a transmission circuit 21 and a first cartridge 60. The transmission circuit 21 is provided in the apparatus main body 12 and is connected to the control circuit 17. The transmission circuit 21 transmits the operation command from the control circuit 17 to the first cartridge 60 by radio communication, and functions as a transmission section.

The first cartridge 60 is configured to receive the operation command from the control circuit 17 by radio communication and cause the actuator 34 to operate by an internal power supply. Specifically, the first cartridge 60 according to the second embodiment includes the first processing tool 31, the pinch section 33, the actuator 34, the second drive circuit 36, a first housing 61, a battery 62, and a reception circuit 63.

The first housing 61 is longer in the vertical direction than the first housing 32 of the first embodiment. The battery 62 is accommodated in the first housing 61 as illustrated in FIG. 10. For example, the battery 62 is a primary battery, which is a normal dry battery, but instead may be a second battery such as a rechargeable battery. As illustrated in FIG. 11, the battery 62 supplies electric power to the actuator 34 through the second drive circuit 36. In other words, the battery 62 is an internal power supply for operating the actuator 34.

Figure 10:
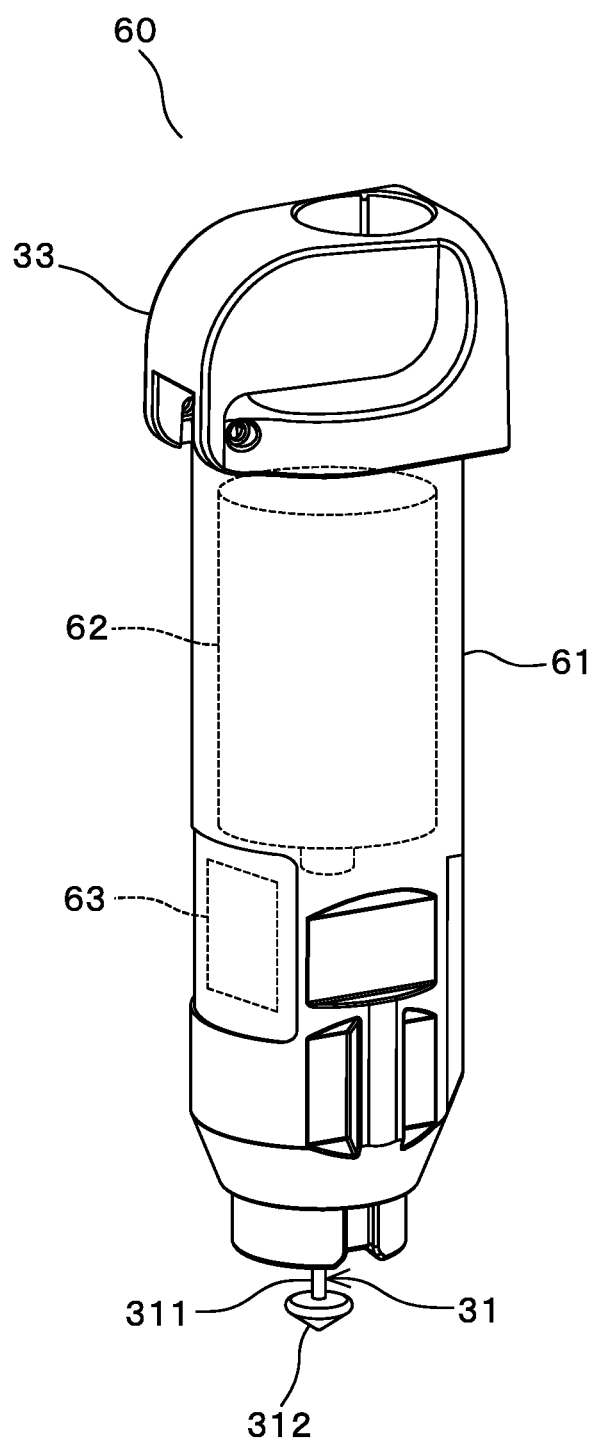
FIG. 10 is a perspective view illustrating a first cartridge of a second embodiment.
Figure 11:
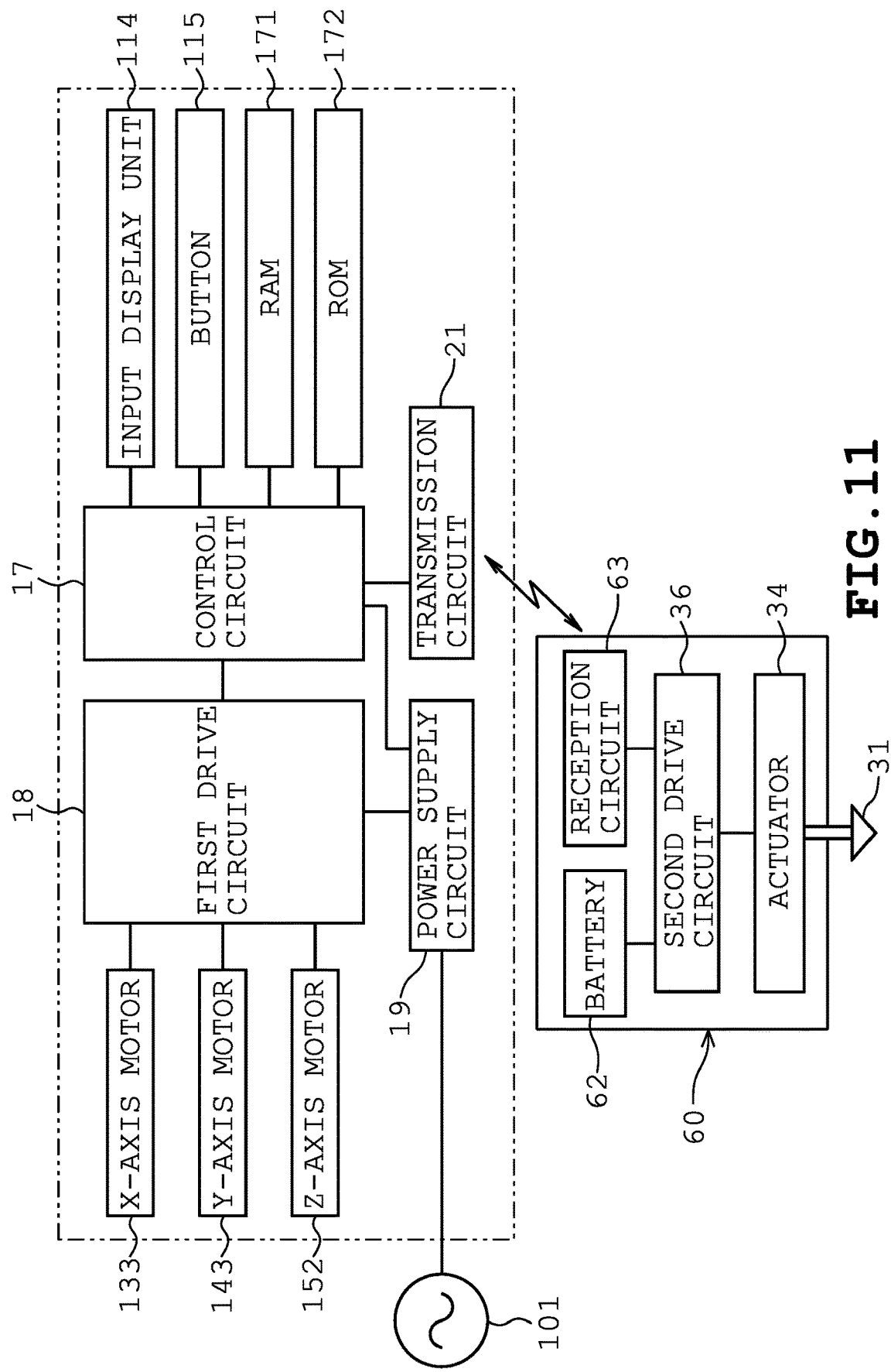
FIG. 11 is a block diagram illustrating an electrical configuration of the processing apparatus.

As illustrated in FIG. 10, the reception circuit 63 is accommodated in the first housing 61. As illustrated in FIG. 11, the reception circuit 63 is electrically connected to the second drive circuit 36, receives the operation command transmitted from the transmission circuit 21, and transmits the operation command to the second drive circuit 36. In this case, the reception circuit 63 functions as a reception section that receives the operation command transmitted from the transmission circuit 21.

In the second embodiment, the processing apparatus 10 does not include the connected section 20 and the connecting section 35. In other words, the connected section 20 in the apparatus main body 12 and the connecting section 35 in the first cartridge 60 are not provided. Although not illustrated in detail, the processing apparatus 10 is configured to be able to discriminate the type of the cartridge mounted on the mounting section 151. Further, the transmission circuit 21 and the reception circuit 63 may be configured to perform so-called short-range radio communication that allows the transmission circuit 21 and the reception circuit 63 to communicate with each other in a state where the first cartridge 60 is mounted on the mounting section 151. Thus, the control circuit 17 detects a state where the reception circuit 63 and the transmission circuit 21 can perform radio communication, thereby detecting that the first cartridge 60 is mounted on the mounting section 151.

In this structure, when the first cartridge 60 is mounted on the connected section 20, the control circuit 17 transmits the operation command for the actuator 34 from the transmission circuit 21. When the reception circuit 63 receives the operation command from the transmission circuit 21 and transmits the operation command to the second drive circuit 36, and the second drive circuit 36 operates the actuator 34.

Accordingly, there is no need to electrically connect the first cartridge 60 and the apparatus main body 12 by a connector. That is, since there is no need to provide a connector, the number of components and the cost of components can be reduced. This results in facilitating user's handling of the first cartridge 60 and further enhancing the user's convenience.

Third Embodiment

Figure 12:
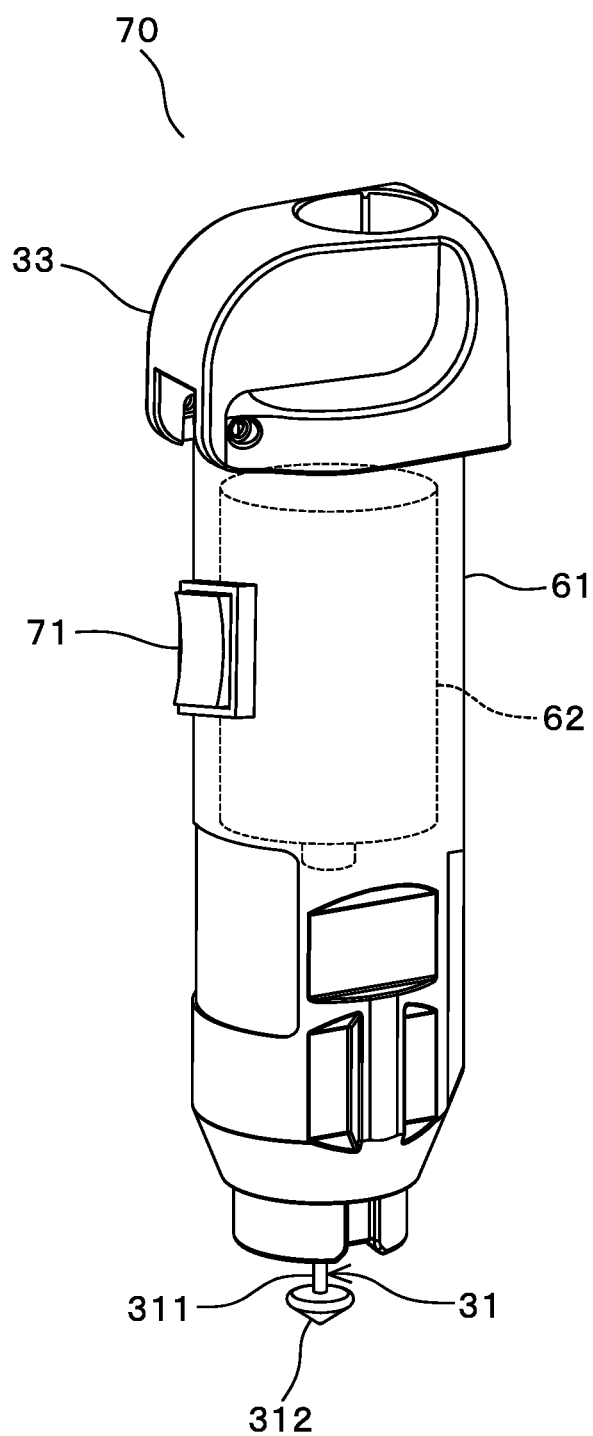
FIG. 12 is a perspective view illustrating a first cartridge according to a third embodiment.
Figure 13:
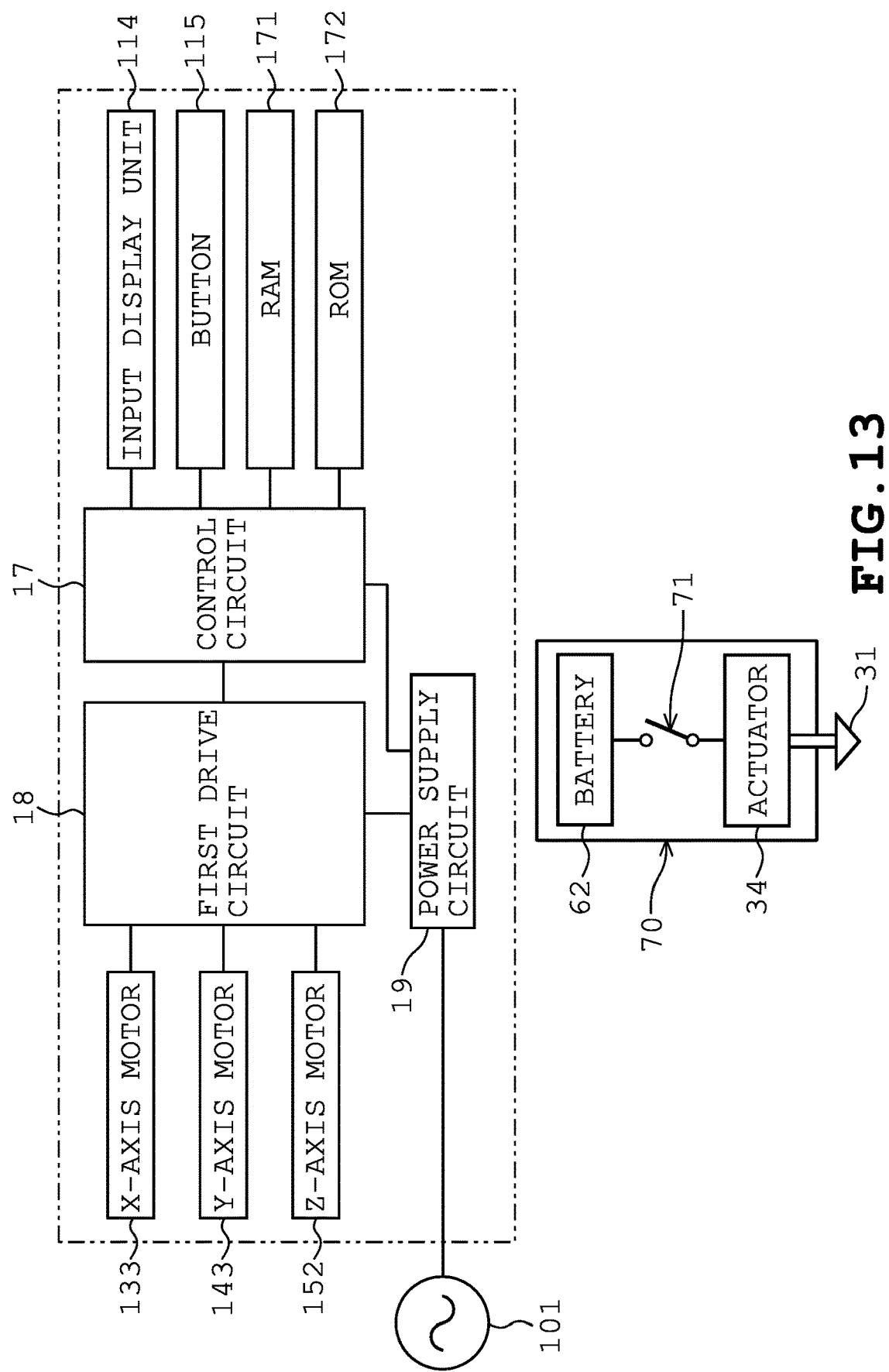
FIG. 13 is a block diagram illustrating an electrical configuration of the processing apparatus.

Next, a third embodiment will be described with reference to FIGS. 12 and 13. Components of the third embodiment that are different from the first and second embodiments will be mainly described.

A first cartridge 70 according to the third embodiment is configured to operate the actuator 34 by an internal power supply, without receiving electric power supplied from the external power supply 101 through the apparatus main body 12. Further, the actuator 34 of the third embodiment is configured to operate independently of the control of the control circuit 17, without receiving the operation command from the control circuit 17 with a wire or wirelessly. In other words, the first cartridge 70 of the third embodiment is configured to be completely independent of the apparatus main body 12.

Specifically, the first cartridge 70 according to the third embodiment includes the first processing tool 31, the pinch section 33, the actuator 34, the first housing 61, the battery 62, and a switch 71. As illustrated in FIG. 12, the switch 71 is provided on a side surface of the first housing 61. The switch 71 switches conduction and non-conduction of electric power supplied to the actuator 34 from the battery 62. Specifically, when the switch 71 is turned on, electric power is supplied to the actuator 34 from the battery 62, thereby allowing the actuator 34 to operate. On the other hand, when the switch 71 is turned off, the electric power to the actuator 34 from the battery 62 is interrupted, thereby suspending the operation of the actuator 34. Thus, the user turns on or off the switch 71, thereby allowing the actuator 34 to operate or suspend the operation of the actuator 34.

In this case, the apparatus main body 12 according to the third embodiment does not include the connected section 20 of the first embodiment and the transmission circuit 21 of the second embodiment. The first cartridge 70 of the third embodiment does not include the connecting section 35 of the first embodiment and the reception circuit 63 of the second embodiment.

Accordingly, the processing apparatus 10 of the third embodiment can use the first cartridge 70, without being provided with the connected section 20 and the connecting section 35 of the first embodiment, or without being provided with the transmission circuit 21 and the reception circuit 63 of the second embodiment. In other words, even in the cutting apparatus of related art including, for example, a cutter cartridge and a pen cartridge, when the first cartridge 70 is mounted on the cutting apparatus, processing for forming a pattern or design by forming a machining mark by grinding can be performed on an object.

Other Embodiments

The present disclosure is not limited to the embodiments described above and can be expanded or modified in various ways without departing from the scope of the present disclosure.

For example, the electrical configurations of the processing apparatus 10 and the first cartridges 30 and 60 can be changed as appropriate. The type of the motor that is the actuator accommodated in each of the first cartridges 30, 60, and 70 and the control method thereof can also be changed as appropriate.

Further, in the first embodiment, the shape of the processing section 312 of the first processing tool 31 is limited to a conical shape, but instead may be, for example, a disk shape, a cylindrical shape, a prism shape, or a hemispherical shape.

Further, in the third embodiment, the first cartridge 70 may include a drive circuit for operating the actuator 34.

The configurations of the embodiments described above may be combined as appropriate.

In the embodiments described above, a single CPU may perform all of the processes. Nevertheless, the disclosure may not be limited to the specific embodiment thereof, and a plurality of CPUs, a special application specific integrated circuit ("ASIC"), or a combination of a CPU and an ASIC may be used to perform the processes.

The foregoing description and drawings are merely illustrative of the principles of the disclosure and are not to be construed in a limited sense. Various changes and modifications will become apparent to those of ordinary skill in the art. All such changes and modifications are seen to fall within the scope of the disclosure as defined by the appended claims.

We claim:

1. A processing apparatus comprising:
a first cartridge including:
   a first processing tool configured to form a machining mark by grinding or cutting a surface of a sheet-like object;
   an actuator configured to operate by an external power supply and drive the first processing tool;
   a first housing configured to accommodate the first processing tool in a state where a tip of the first processing tool is exposed and also accommodate the actuator; and
   a connecting section configured to connect the actuator and the external power supply,
a carriage including:
   a mounting section configured to detachably mount the first cartridge; and
   a connected section connectable to the connecting section in response to mounting of the first cartridge on the mounting section,
a transfer mechanism configured to move the object and the carriage relatively to each other; and
a control section configured to control driving of the transfer mechanism in such a way that the machining mark is formed on the surface of the object by the first processing tool,
wherein in response to connection of the connecting section to the connecting section, electric power is supplied to the actuator from the external power supply.

2. The processing apparatus according to claim 1, wherein the control section controls the electric power supplied to the actuator from the external power supply.

3. The processing apparatus according to claim 1, wherein the connection section is provided at a location connected to the connecting section when the first cartridge is mounted on the mounting section.

4. The processing apparatus according to claim 1, further comprising:
a transmission section configured to transmit an operation command from the control section to the first cartridge by radio communication; and a reception section provided in the first cartridge and configured to receive the operation command transmitted from the transmission section.

5. The processing apparatus according to claim 1, wherein the first cartridge includes a switch configured to switch between operation and suspension of the actuator.

6. The processing apparatus of claim 1, further comprising:
a second cartridge including:
a second processing tool configured to cut the object; and
a second housing configured to accommodate the second processing tool in a state where a tip of the second processing section is exposed, where
the first cartridge and the second cartridge are selectively mountable on the mounting section, and
when the second cartridge is mounted on the mounting section, the control section controls driving of the transfer mechanism in such a way that the object is cut by the second processing tool.

7. The processing apparatus according to claim 1, further comprising:
a third cartridge including:
a pen for drawing on a surface of the object; and
a third housing configured to accommodate the pen in a state where the tip of the pen is exposed, wherein
the first cartridge and the third cartridge are selectively mountable on the mounting section, and
when the third cartridge is mounted on the mounting section, the control section controls driving of the transfer mechanism in such a way that drawing is performed on the surface of the object by the pen.

8. A cartridge comprising:
a first processing tool configured to form a machining mark by grinding or cutting a surface of a sheet-like object;
an actuator configured to operate by an external power supply and drive the first processing tool;
a housing configured to accommodate the first processing tool in a state where a tip of the first processing tool is exposed and also accommodate the actuator; and
a connecting section configured to connect the actuator and the external power supply,
wherein the machining mark is formed on the surface of the object by the first processing tool in such a way that the object and the cartridge are moved relatively to each other in a state where the cartridge is detachably mounted on a mounting section of a carriage included in a processing apparatus and in response to connection of the connecting section to a connected section provided in the carriage, electric power is supplied to the actuator from the external source and the actuator is operated.

9. The cartridge according to claim 8, further comprising a reception section configured to receive an operation command transmitted from a transmission section of the processing apparatus by radio communication.

10. The cartridge according to claim 8, further comprising a switch configured to switch between the operation and suspension of the actuator.

* * * * *